May 24, 1932.  P. M. FREER  1,859,360

WRIST PIN CONSTRUCTION

Filed July 28, 1930

INVENTOR
Phelps M. Freer

BY
Whittemore Hulbert Whittemore Belknap

ATTORNEYS

Patented May 24, 1932

1,859,360

UNITED STATES PATENT OFFICE

PHELPS M. FREER, OF DETROIT, MICHIGAN

WRIST PIN CONSTRUCTION

Application filed July 28, 1930. Serial No. 471,363.

The invention relates to wrist pin constructions for connecting pistons and connecting rods and has for one of its objects to provide a bushing upon which the connecting rod is journaled and to hold this bushing from bodily movement relative to the piston. Another object is to so construct the connection between the bushing and the piston that this connection is at all times held from bodily movement relative to the piston irrespective of the expansion and contraction of the latter. A further object is to provide a novel means for reinforcing the connection between the bushing and the piston.

Figure 1:
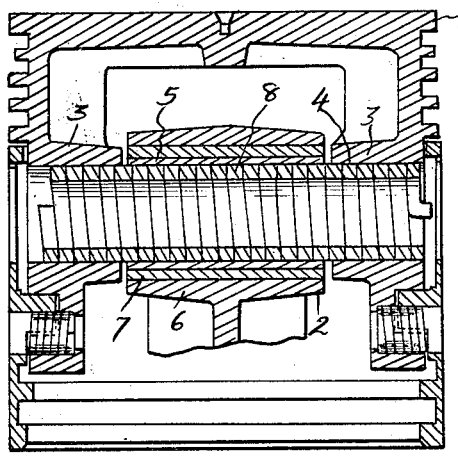
Figure 2:
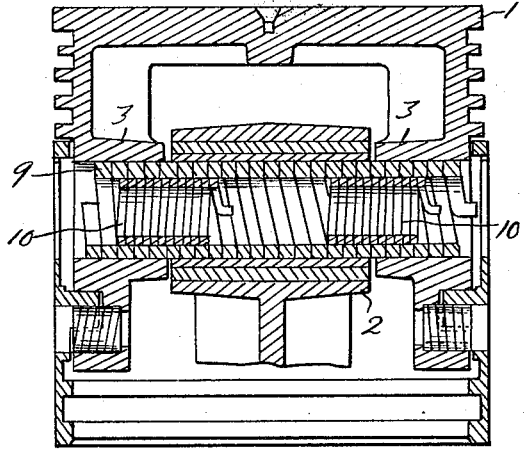
Figure 3:
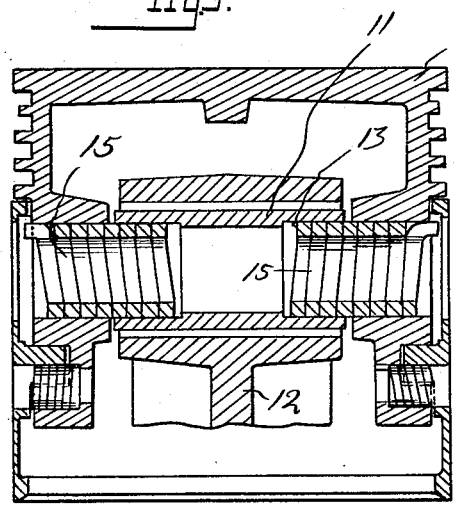
Figure 4:
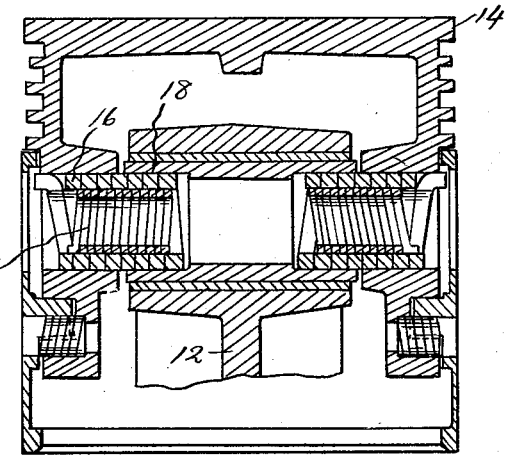

These and other objects of the invention will become apparent from the following description and claims and the accompanying drawings, in which Figure 1 is a longitudinal median section through a piston having a wrist pin construction embodying my invention;

Figures 2, 3 and 4 are similar views, showing modifications.

As illustrated in Figure 1, the piston has the head 1 which is preferably formed of aluminum or an aluminum alloy. 2 is the connecting rod. The head has the diametrically opposite hubs 3 having aligned openings 4. 5 is a cylindrical bushing, the internal diameter of which is the same as the diameter of the openings 4 when the parts are at normal temperature. This bushing is preferably formed of steel and hardened and its outer face only is ground. The connecting rod 2 has at its upper end the apertured boss 6 in which is fixedly secured the cylindrical bushing 7, which is preferably formed of bronze and has an internal diameter providing a journal fit upon the bushing 5.

To connect the piston and the connecting rod 2 I have provided the resilient tubular member which extends through the bushing 5 and into the hubs 3 and the opposite ends of which terminate within the outer face of the skirt of the piston. This resilient tubular member is a resilient wire coil having its adjacent convolutions in contact with each other and also preferably having a constant rectangular cross section throughout its length. This coil is under radial compression at all times, since its normal outer diameter is greater than the diameter of the bushing 5 and hubs 3 when the bushing and hubs have been expanded to the maximum during the operation of the piston. To insert the coil, it is wound by a suitable tool to contract its diameter and after insertion this tool is removed so that the convolutions of the coil tightly engage the bushing 5 and the hubs 3.

It will be seen that the lead of the coil is relatively small, it being equal to the width of the wire, so that the coil will withstand any shearing stresses at the gaps between the bushing 5 and the hubs 3 to which it may be subjected during operation of the piston. It will also be seen that the coil maintains tight engagement with the bushing 5 and the hubs 3 at all times, irrespective of the relative expansion and contraction of these parts, so that it might be said that the bushing 5 is locked or held from bodily movement relative to the hubs and as a result the bushing 7 must rotate, or rather oscillate, about the bushing 5.

In the modification shown in Figure 2, I have further provided means for reinforcing the coil 9, which corresponds to the coil 8 of Figure 1, at the points or zones of shearing stress upon the coil. Specifically, the reinforcing means comprises a pair of resilient tubular wire coils 10 of rectangular cross section throughout their lengths, these coils being located within and engaging the coil 9 and overlapping the gaps between the inner bushing and the hubs. These coils 10 are under compression at all times and are adapted to be inserted into the coil 9 in much the same manner that the coil 9 is inserted into place.

In the modification shown in Figure 3, the hardened steel bushing 11 upon which the connecting rod 12 is journalled is provided with an opening therethrough having the enlarged end portion 13. For connecting the connecting rod 12 and the piston 14 I have provided the pair of resilient tubular wire coils 15 which are formed in the same manner as the coil 8, but are, of course, shorter. Each of these coils 15 extends within one of the enlarged end portions 13 and abuts an annular shoulder 16 formed between the enlarged end portion and the intermediate portion of the opening and also extends within one of the hubs of the piston and each of the coils is also under compression at all times irrespective of the relative expansion and contraction of the parts with which the coil engages. The arrangement is such that the two coils connect the piston and connecting rod and hold the inner bushing from bodily movement relative to the hubs of the piston.

As shown in Figure 4, the construction of Figure 3 is modified by reinforcing each coil 16, which corresponds to the coil 15, with the resilient tubular wire coil 17. Each of these coils 17 extends across a gap between the inner bushing 18 and the adjacent hub of the piston and is formed in the same manner as the reinforcing coil 10 of resilient wire of constant rectangular cross section with its convolutions in contact, it being understood that each of these coils 17 is also under compression at all times.

What I claim as my invention is:

1. The combination with a piston and a connecting rod, of a bushing upon which said rod is journalled, a resilient coil extending through said bushing and into said piston at opposite ends of said bushing and resilient coils within and firmly engaging said first mentioned coil and extending across the gaps between said bushing and piston.

2. The combination with a piston and a connecting rod, of a bushing upon which said rod is journalled and resilient tubular members under compression each extending within and engaging an end portion of said bushing and the adjacent portion of said piston for connecting said piston and rod.

3. The combination with a piston and a connecting rod, of a bushing upon which said rod is journaled and resilient coils under compression extending within and engaging an end portion of said bushing and the adjacent portion of said piston for holding said bushing and piston from bodily relative movement.

4. The combination with a piston and a connecting rod, of a bushing upon which said rod is journalled, resilient coils under compression extending within and engaging an end portion of said bushing and the adjacent portion of said piston for holding said bushing and piston from bodily relative movement, and a resilient coil under compression within each of said first mentioned coils and engaging said coils and extending across the gaps between said bushing and piston.

5. The combination with a piston and a connecting rod having aligned bearings, of a radially contracted resilient wrist pin having portions respectively engaging said aligned bearings, and independently radially expansible to compensate for differential thermal expansion in the bearings.

6. The combination with a piston and a connecting rod having aligned bearings, a sleeve or bushing forming a journal for one of said bearings, and a radially contracted resilient wrist pin having portions respectively engaging the bushing in the one member and the bearing of the other member independently radially expansible to compensate for differential thermal expansion.

7. The combination with a piston and a connecting rod having aligned wrist pin bearings, of a resilient tubular wrist pin radially contracted and engaging said aligned bearings, the portions engaging the respective bearings being independently radially expansible to compensate for differential thermal expansion.

8. The combination with a piston and a connecting rod having aligned bearings, of a wrist pin formed of a resilient helix torsionally tensioned to contract the diameter thereof and having portions engaging the respective bearings independently radially expansible to compensate for differential thermal expansion.

9. The combination with a piston and a connecting rod having aligned wrist pin bearings, of a sleeve or bushing forming a journal in a bearing of one of said members and a wrist pin formed of a resilient helix torsionally compressed to contract the diameter of the same and having portions fitting within said bushing and a bearing of the other member independently radially expansible to compensate for differential thermal expansion.

In testimony whereof I affix my signature.

PHELPS M. FREER.